United States Patent [19]
Skuse

[11] Patent Number: 6,003,448
[45] Date of Patent: Dec. 21, 1999

[54] WOODEN PALLETS AND COMPONENTS THEREFOR

[75] Inventor: Thomas P. Skuse, Rancho Cucamonga, Calif.

[73] Assignee: G. W. Manufacturing Co., Inc., Rancho Cucamonga, Calif.

[21] Appl. No.: 09/137,480

[22] Filed: Aug. 20, 1998

Related U.S. Application Data

[63] Continuation-in-part of application No. 08/985,595, Dec. 5, 1997.

[51] Int. Cl.$^6$ .................................................. B65D 19/38
[52] U.S. Cl. .................................. 108/51.11; 108/517.17; 156/274.6; 156/274.8
[58] Field of Search .............................. 108/52.1, 51.11, 108/57.17, 57.2; 428/54, 114, 528, 529, 535; 156/274.6, 274.8; 144/347, 350, 352

[56] References Cited

U.S. PATENT DOCUMENTS

| | | | |
|---|---|---|---|
| 1,561,063 | 11/1925 | Dunlap . | |
| 2,503,022 | 4/1950 | Benoist et al. | 248/120 |
| 2,571,604 | 10/1951 | Payzant | 154/116 |
| 2,708,649 | 5/1955 | Cunningham | 154/116 |
| 2,908,600 | 10/1959 | Nicholson | 154/116 |
| 3,212,462 | 10/1965 | Pasquier | 108/51 |
| 3,262,723 | 7/1966 | Strickler | 144/347 |
| 3,316,948 | 5/1967 | Drake | 144/318 |
| 3,351,028 | 11/1967 | Davidson | 108/56 |
| 3,990,937 | 11/1976 | Knowles | 156/558 |
| 4,240,358 | 12/1980 | Munroe | 108/51.1 |
| 4,314,871 | 2/1982 | Weinstock et al. | 156/258 |
| 4,456,498 | 6/1984 | Churchland | 156/275.5 |
| 4,994,138 | 2/1991 | Prihoda | 156/580 |
| 5,050,653 | 9/1991 | Brown | 114/351 |
| 5,076,175 | 12/1991 | Whatley, II | 108/57.17 |
| 5,240,050 | 8/1993 | Shing | 144/350 |
| 5,505,140 | 4/1996 | Wittmann | 108/51.1 |
| 5,537,919 | 7/1996 | Beilfeldt et al. | 100/48 |

OTHER PUBLICATIONS

Carruthers, J.F.S. "The Risborough Continuous Laminating Machine" Wood. Oct., 1965. pp. 51–54, Oct. 1965.

*Primary Examiner*—Michael W. Ball
*Assistant Examiner*—Michael A. Tolin
*Attorney, Agent, or Firm*—Loeb & Loeb LLP

[57] ABSTRACT

In accordance with one exemplary embodiment of the invention, there is provided a wooden pallet having parallel ends, parallel sides, a top deck for receiving a load and a bottom deck parallel with the top deck. The pallet further includes at least two continuous stringers between the top and bottom decks to maintain said decks in spaced relationship, the stringers extending longitudinally between the ends of the pallet and wherein each stringer is constructed of continuous wood stock assembled from face laminated, glued scrap wood strips of random length. In accordance with another aspect of the present invention, at least one of the decks comprises a plurality of parallel, spaced apart boards extending transversely between the sides of the pallet and wherein each board is constructed of wood stock assembled from face laminated glued scrap wood strips of random length.

17 Claims, 9 Drawing Sheets

WOODEN PALLETS AND COMPONENTS THEREFOR

CROSS REFERENCE TO RELATED APPLICATION

This application is a continuation-in-part of application Ser. No. 08/985,595 filed Dec. 5, 1997.

FIELD OF THE INVENTION

This invention relates generally to wooden pallets fabricated of components cut from face laminated stock manufactured on a continuous basis from wood strips of random length.

BACKGROUND OF THE INVENTION

Wooden pallets or skids have long been used as platforms for the shipping and storage of a wide range of goods. A great variety of pallets are in common use; a typical pallet comprises spaced parallel horizontal top and bottom decks attached to at least two longitudinally extending, transversely spaced apart stringers interposed between the decks. Loaded pallet units are conveyed by means of fork lifts having tongs that are inserted at spaced locations between the top and bottom decks of the pallet. Although pallets are designed to withstand shock and heavy loads, because of damage due to rough handling they have limited lives and typically are discarded after only several times of reuse. Because of such turnover, hundreds of millions of wooden pallets are manufactured each year consuming a significant amount of timber. The highly automated process of manufacturing wooden pallets itself generates a large amount of scrap lumber which must be somehow disposed of whether by burning, grinding or otherwise. In any event, such scrap represents an annual waste of many forest acres thus presenting an environmental issue and adding further to the price of increasingly expensive timber.

SUMMARY OF THE INVENTION

In accordance with one aspect of the present invention, the recovery of wood waste is provided for by converting scrap wood into environmentally responsible, usable product thereby conserving increasingly scarce timber resources. Wood product made by a process according to the present invention is furthermore strong, warp-free and has been found to be particularly advantageous for making pallet "shook", that is, pallet components such as stringers and deck pieces. High strength pallets made in accordance with aspects of the present invention are therefore better able to withstand the rigors of typical use increasing the life of the pallets and thereby further contributing to the conservation of timber resources.

In accordance with one exemplary embodiment of the invention, there is provided a wooden pallet having parallel ends, parallel sides, a top deck for receiving a load and a bottom deck parallel with the top deck. The pallet further includes at least two continuous stringers between the top and bottom decks to maintain said decks in spaced relationship, the stringers extending longitudinally between the ends of the pallet and wherein each stringer is constructed of continuous wood stock assembled from face laminated, glued wood scrap strips of random length.

In accordance with another aspect of the present invention, at least one of the decks comprises a plurality of parallel, spaced apart boards extending transversely between the sides of the pallet and wherein each board is constructed of wood stock assembled from face laminated glued wood scrap strips of random length.

In accordance with yet another aspect of the present invention, there is provided wooden pallet shook manufactured by a method comprising the steps of assembling nominally dimensioned scrap lumber strips of random lengths in face-to-face relationship with heat curable adhesive on adjacent faces of the strips to form wood stock having a substantially constant cross section shape along the length of the stock; advancing the wood stock in a longitudinal direction of travel while applying pressure in a press zone across the opposite outer side faces of the stock along a direction perpendicular to the direction of travel; subjecting the stock to RF energy applied in an adhesive curing zone extending along at least a portion of the press zone; and cutting the wood stock so formed into lengths usable for pallet shook.

BRIEF DESCRIPTION OF THE DRAWINGS

Further objects, features and advantages of the invention will become evident from the detailed description below when read in conjunction with the accompanying drawings in which.

DETAILED DESCRIPTION OF THE PREFERRED EMBODIMENTS

Figures 1, 2:
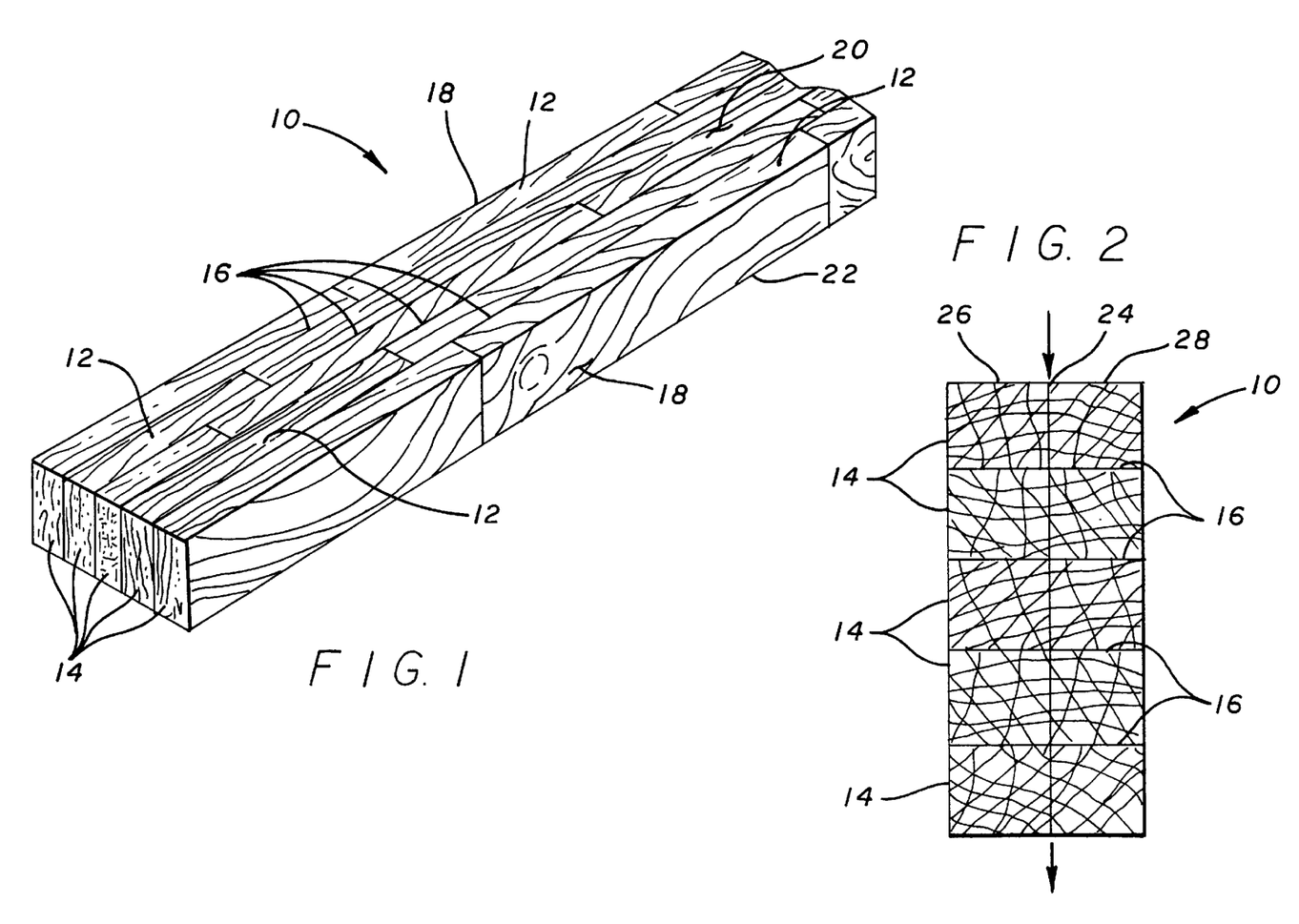
FIG. 1 is a perspective view of a portion of 2×4 laminated wood stock which may be used to fabricate pallet "shook"
FIG. 2 is a transverse cross section of the wood stock of FIG. 1.

With reference to FIG. 1, there is shown a representative length of a face-laminated wood product 10 as it would appear both before and after processing by the apparatus and method disclosed herein. Basically, the laminated wood product 10 is formed by bonding together scrap wooden layers or strips 12 with the grain of the strips all running in one direction. The strips 12 are of random lengths cut to uniform, nominally dimensioned thickness and width. By way of example, the face-laminated wood product 10 shown in FIG. 1 includes five laminations 14, bonded by moisture resistant glue or synthetic resin along four parallel, longitudinally extending glue lines 16 to form a product of uniform cross-section including parallel outer side faces 18 and parallel top and bottom substantially planar surfaces 20 and 22, respectively, defined by the co-planar edges of the laminated rows of wood strips 12. Five adhesively bonded laminations each measuring about 11/16 inch thick by 1 5/8 inches wide can be finished to form low-cost yet high-strength, uniform, warp-free 2×4 stock usable for a variety of industrial and commercial purposes including the fabrication of low-cost expendable items such as pallets. For example, the 2×4 stock 10 can be used to fabricate pallet stringers. In addition, with reference to FIG. 2, by sawing the laminated product 10 lengthwise along central saw line 24 perpendicular to the glue lines 16, a pair of approximately 1×4 laminated boards 26 and 28 can be produced which can be cut to length for use as pallet deck pieces. As will be explained below, the wood product 10 fabricated in accordance with the present invention may be made continuously (that is, without interruption in the operation of the apparatus) and of any length desired by assembling any number of wood strips end-to-end in each row of the laminated stock.

Figure 3:
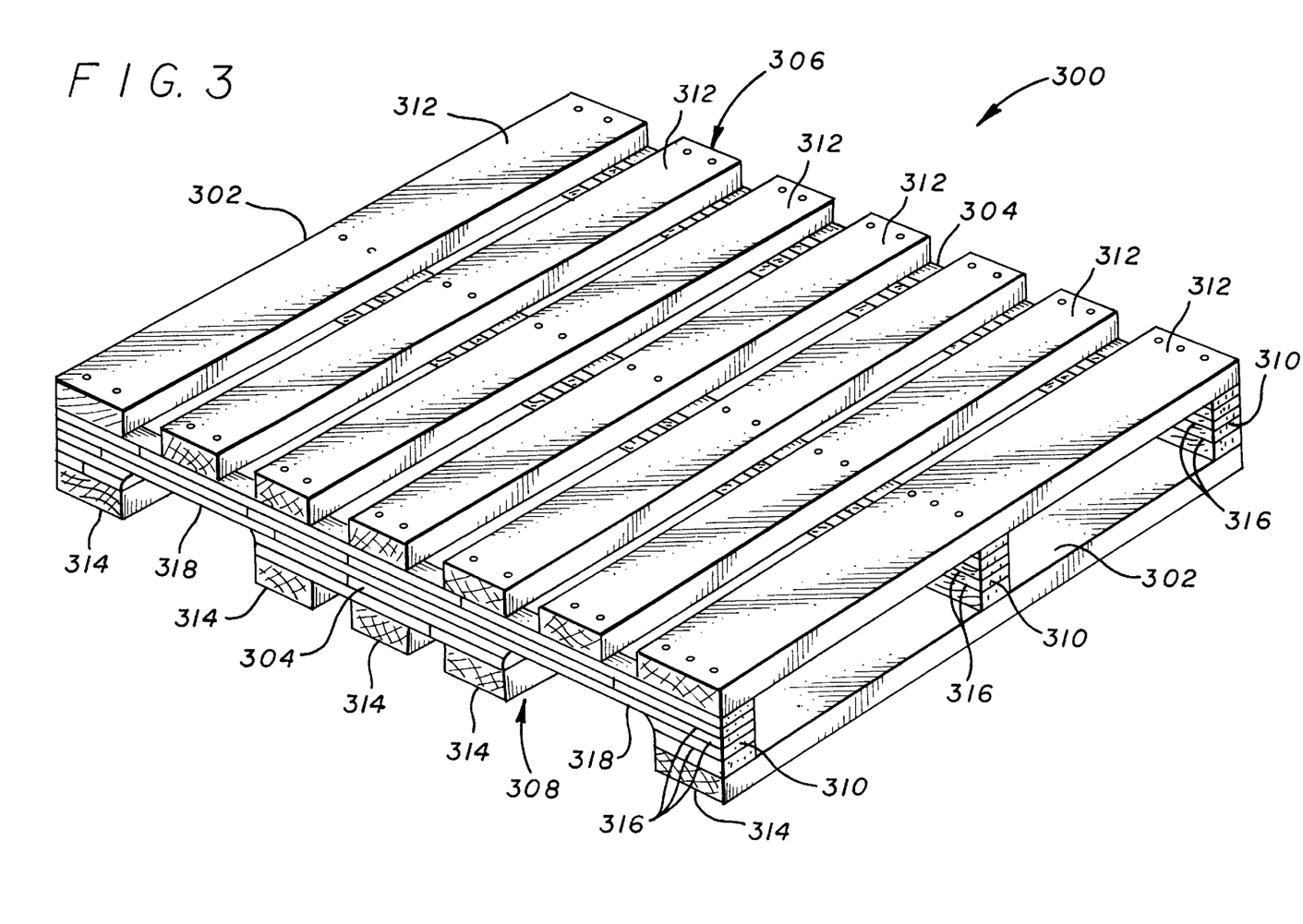
FIG. 3 is a perspective view of a first embodiment of a wooden pallet constructed in accordance with aspects of the present invention.

With reference to FIG. 3, there is shown a pallet 300 having parallel ends 302 and parallel sides 304, a top deck 306 for receiving a load and a bottom deck 308 parallel with the top deck 306. In well known fashion, the top and bottom decks 306 and 308 are secured to stringers 310 parallel with the sides 304 for maintaining the decks in parallel, spaced relationship. At least two stringers are typically employed; in the example shown in FIG. 3, three stringers 310 are used. It will be evident that the configuration of the pallet 300 shown in FIG. 3 is an example only. As is well known, pallet configurations can vary widely and all are intended to be encompassed within the purview of the invention.

In the embodiment of FIG. 3, the top and bottom decks 306, 308 are made of a plurality of parallel, transversely extending spaced boards 312 and 314, respectively, made of lumber having nominal dimensions such as 1×4. The stringers 310, however, are fabricated from the laminated wood product shown in FIG. 1 with the glue lines 316 running parallel with the top and bottom decks. Formed in each stringer 310 is a pair of longitudinally extending recesses or cutouts 318 dimensioned and spaced apart longitudinally to receive the tongs of a standard fork lift. Pallets constructed using stringers made from the laminated wood product 10 are strong, resistant to damage and have the advantage of being formed from scrap wood that might otherwise be discarded.

Figure 4:
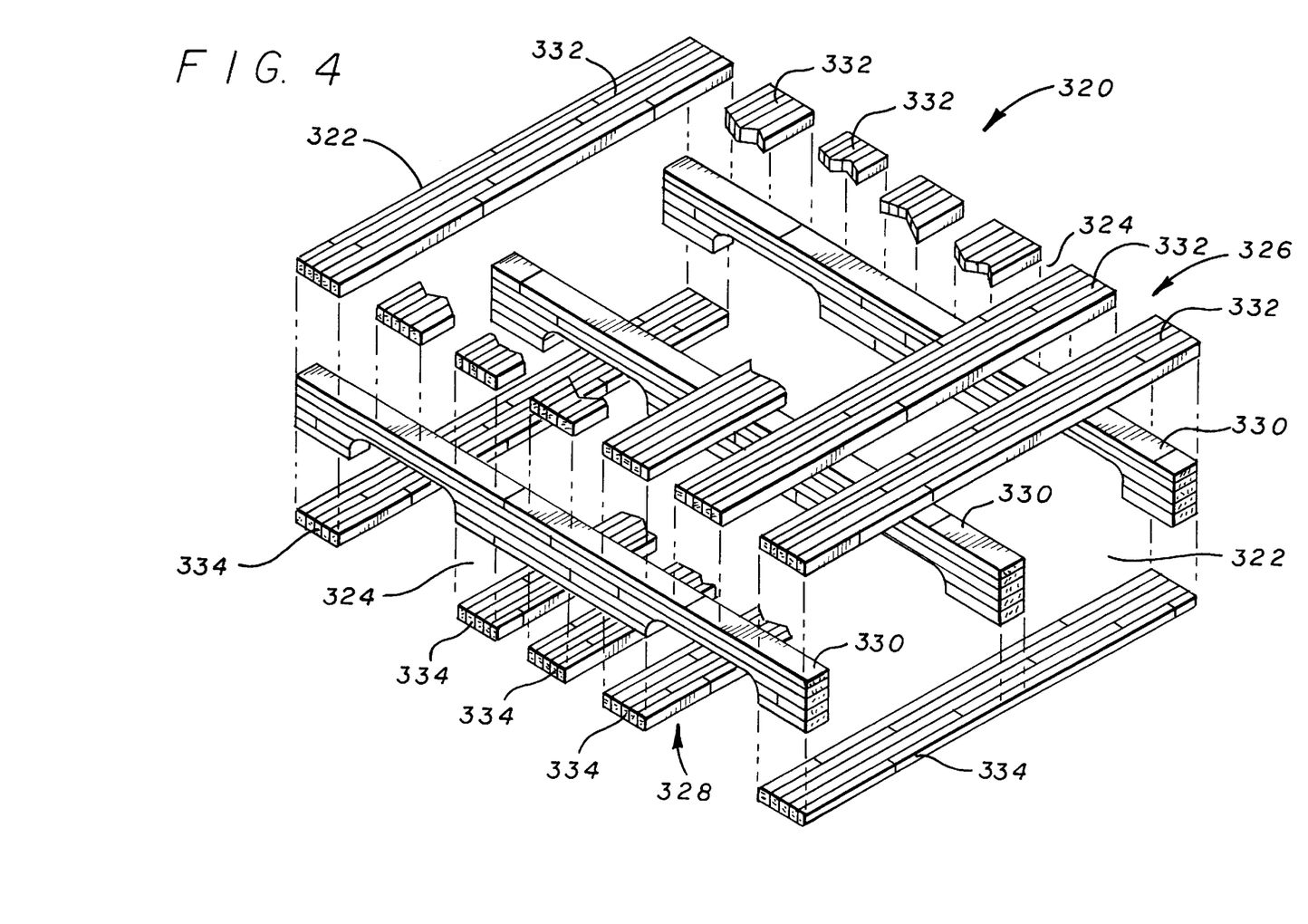
FIG. 4 is an exploded, perspective view of a second embodiment of a wooden pallet constructed in accordance with aspects of the present invention.

FIG. 4 shows another example of a pallet, identified by reference numeral 320, in accordance with the present invention. Like the pallet 300 of FIG. 3, the pallet 320 includes parallel ends 322, parallel sides 324, a top deck 326 for receiving a load and a bottom deck 328 parallel with the top deck 326. Again, at least two and preferably three continuous stringers 330 between the top and bottom decks maintain the decks in spaced relationship. The stringers 330 may be identical to those of FIG. 3. In the embodiment of FIG. 4, however, the pieces 332 and 334 comprising the top and bottom decks 326 and 328, respectively, are fabricated of 1×4 laminated boards such as the boards 26 and 28 shown in FIG. 2 which are produced by sawing the continuous laminated product 10 in half along the central cut line 24. It will thus be seen that all of the wooden pallet "shook" or pallet components, are fabricated of the laminated wood product shown in FIGS. 1 and 2 with all of the advantages thereof, as already explained.

Turning now to FIGS. 5–11, there is shown a continuous press 30 into which assembled, uncured wood product 10 (FIG. 1) is continuously fed from an infeed make-up and glue spreader apparatus (not shown). In the infeed apparatus, the contacting faces of adjacent wood strips 12 are coated with heat curable glue and the glue-coated wood strips are assembled into the relationship shown in FIG. 1. Heat curable glues of the kind used here are well known in the art and typically comprise a two part composition including a suitable catalyst. The continuous press 30 includes a rigid frame 32 comprising horizontal, longitudinally extending frame members 34 connected by transverse frame members 36 and supported at an appropriate height by legs (not shown). Only portions of the frame 32 are shown; the construction of such frames utilizing, for example, square and/or rectangular steel tubing of appropriate sizes, is well known.

Figure 5:
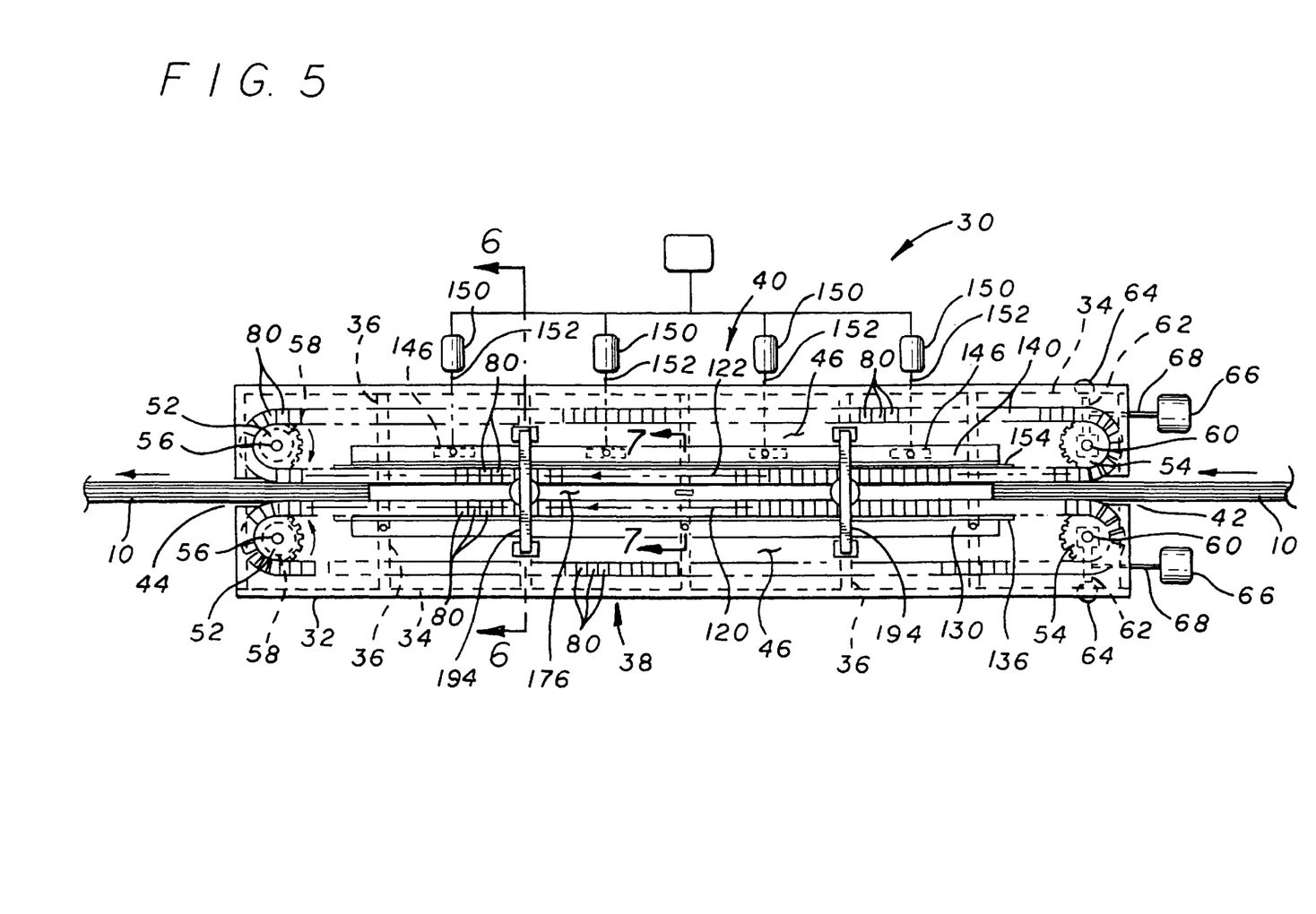
FIG. 5 is a top plan view of a laminated wood stock fabricating apparatus, including a continuous press, in accordance with the present invention.
Figure 6:
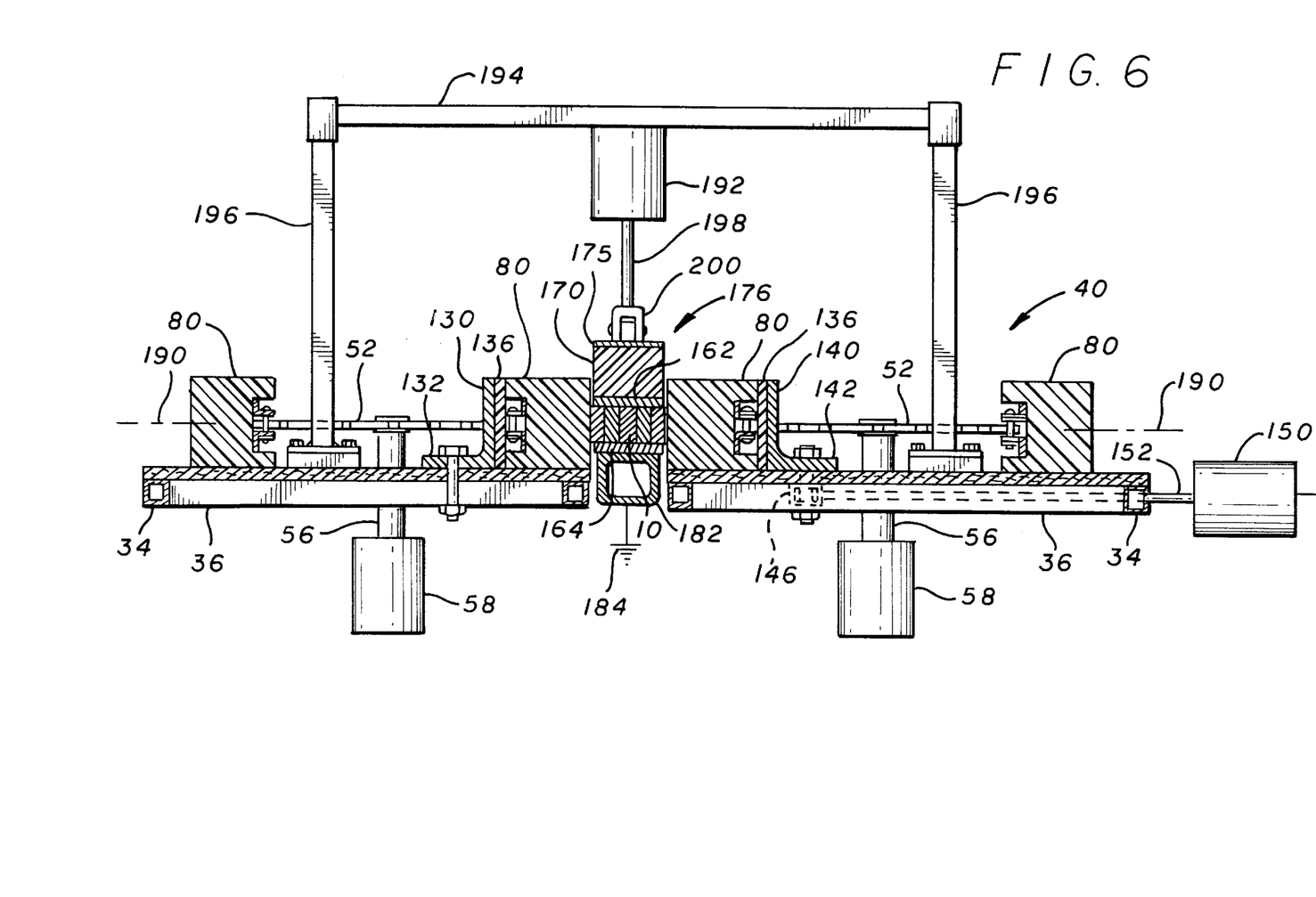
FIG. 6 is a transverse cross section of the apparatus of FIG. 5, as seen along the line 6—6 in FIG. 5.
Figure 7:
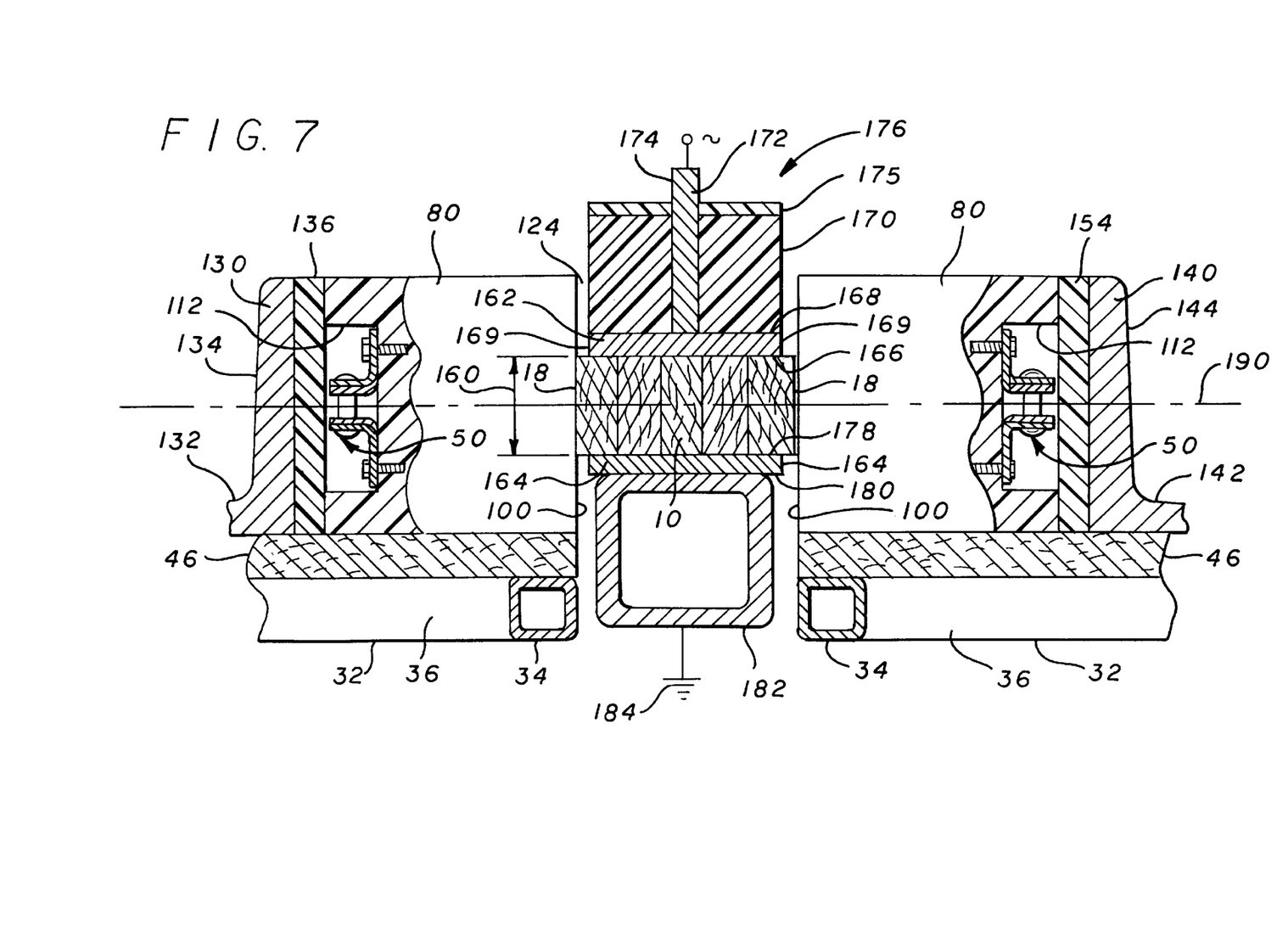
FIG. 7 is a transverse cross section of a portion of the apparatus of FIG. 5, as seen along the line 6—6 in FIG. 5.

The continuous press 30 further includes a pair of horizontal, endless tractor assemblies 38, 40 arranged side-by-side and extending longitudinally between a product infeed end 42 and an outfeed end 44. Each tractor assembly 38, 40 is supported by an electrically insulative base sheet 46 mounted on the frame 32. The base sheet 46 may comprise a phenolic sheet having a thickness of, for example, ½ inch.

Each tractor assembly 38, 40 includes an endless steel drive chain 50 trained about a drive sprocket 52 at the product outfeed end 44 and a tensioning idler sprocket 54 at the product infeed end 42 of the press. The drive and idler sprockets 52 and 54 are made of electrically insulative material such as ultra high molecular weight (UHMW) plastic or the like. Each drive sprocket 52 is mounted on a shaft 56 rotatably driven by a motor 58. The drive motor 58 may be powered electrically or hydraulically and may have an associated speed-reducing transmission for applying the requisite torque to each drive sprocket 52. The rotational speed and diameter of the counterrotating sprockets 52 determine the rate at which the wood product 10 is drawn through the press 30 from the infeed end to the outfeed end. For example, 12 inch diameter drive sprockets 52 driven at about 10 rpm will advance the product 10 through the press 30 at about 30 feet per minute.

Each tensioning idler sprocket 54 at the product infeed end of the continuous press 30 is mounted on a shaft 60. The shaft 60 is mounted on the free end of a hinged arm 62 whose other end is attached to a vertical pivot shaft 64 carried by the frame 32. Each idler sprocket 54 is biased away from the associated drive sprocket 52 by means of a tensioner 66 connected by a coupling 68 to the arm 62 to appropriately tension the chain 50. The sprockets 54 are adjustable along the hinged arms 62 relative to the frame to permit transverse alignment of the chains 50 as required. The drive sprockets 52 may be similarly adjustably mounted. The details of the tensioners 66 and adjustable sprocket mountings are not shown, since these are expedients well known in the sprocket and chain drive technology.

Figure 8:
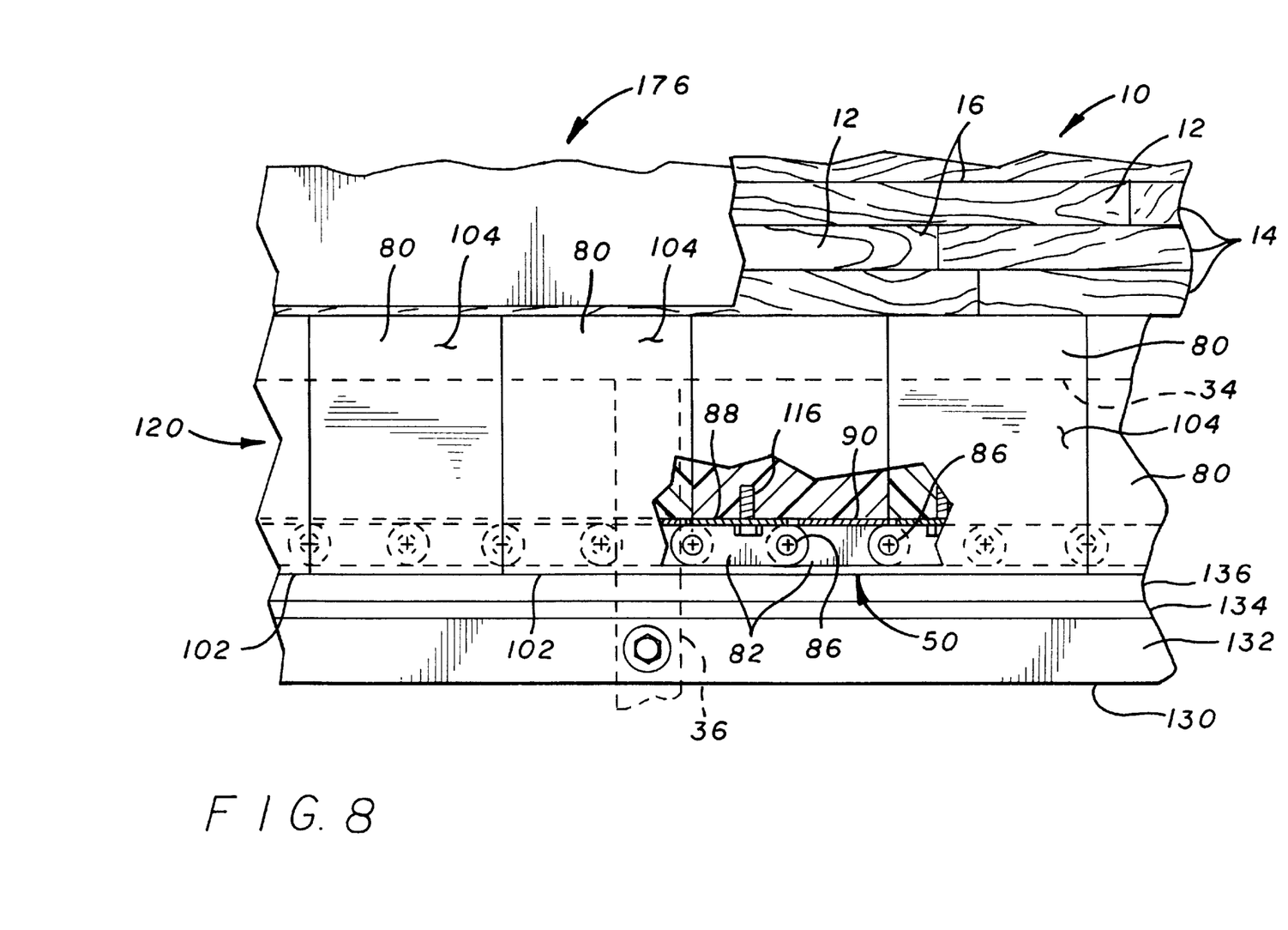
FIG. 8 is an enlargement, partly in cross section, of a portion of the top plan view of FIG. 5.
Figure 9:
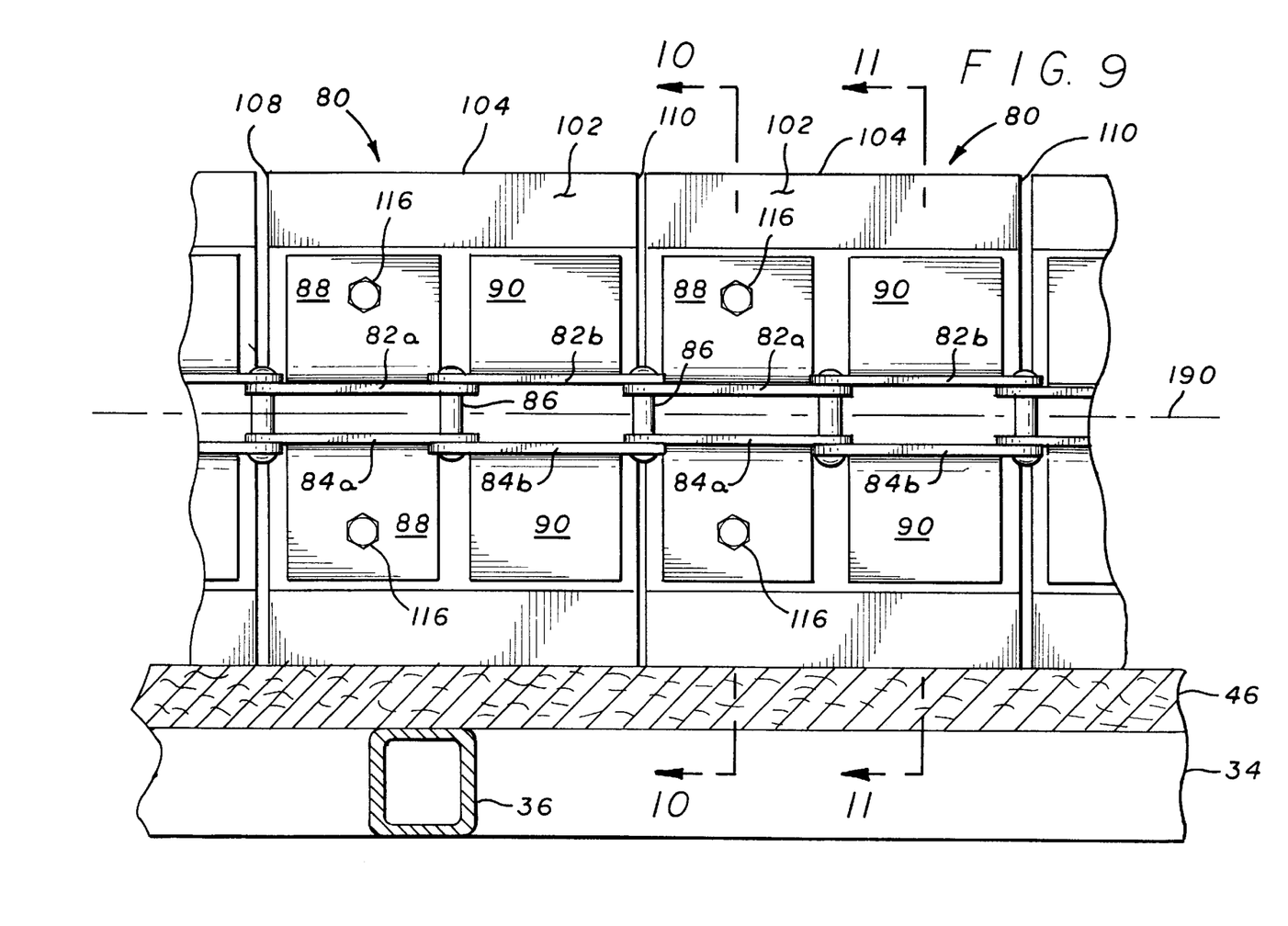
FIG. 9 is a side elevation view, partly in cross section, of a portion of the rear of one of the inner linear runs of the continuous press shown in FIG. 5, as seen along the line 9—9 in FIG. 7.
Figure 10:
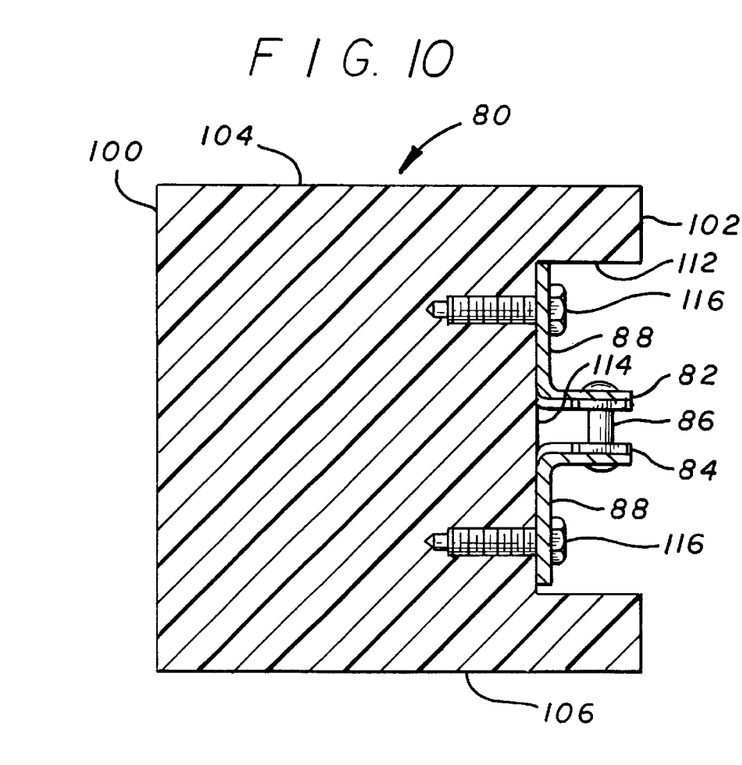
FIGS. 10 and 11 are end elevation views, in cross section, of one of the blocks of the continuous press of the invention, as seen along the lines 10—10 and 11—11, respectively, in FIG. 9.
Figure 11:
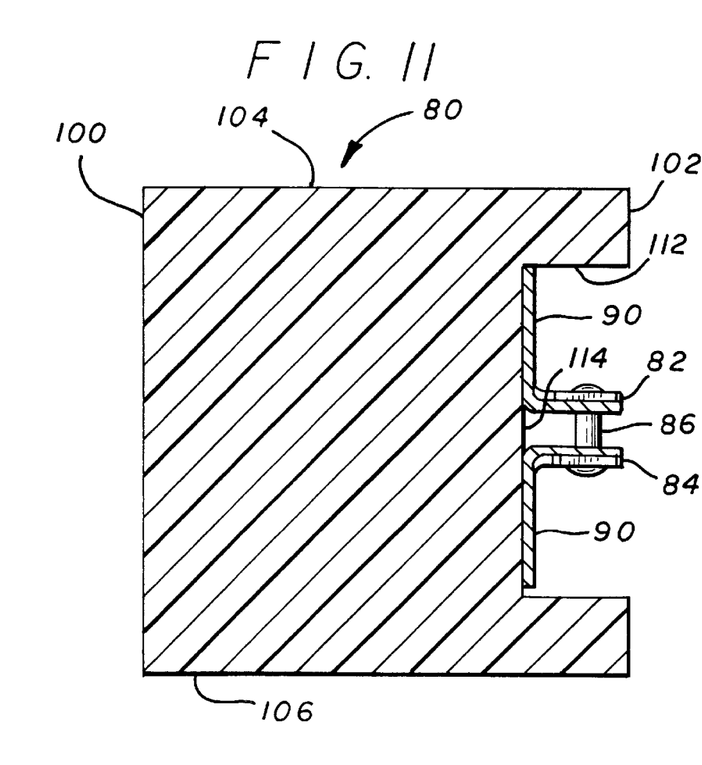

Each tractor assembly 38, 40 includes a series of tractor blocks 80 disposed side-by-side in abutting, or nearly abutting relationship. The tractor blocks 80 are secured to an associated chain 50 so as to be driven thereby. As best seen in FIGS. 7–11, each drive chain 50 is made up of a series of articulated upper and lower links 82 and 84, respectively, joined by drive pins 86. Alternate corresponding pairs of upper and lower links 82*a*, 84*a* include lugs 88 bent outwardly perpendicular to the links; similarly, the intervening corresponding upper and lower links 82*b*, 84*b* include similarly bent lugs 90. Each link set 82*a*, 82*b*, 84*a*, 84*b* is associated with one of the tractor blocks 80 (FIGS. 8 and 9).

The tractor blocks 80 are fabricated from an electrically insulative, high strength, low friction coefficient material such as UHMW plastic. Each tractor block 80 has parallel front and rear faces 100 and 102, respectively, parallel top and bottom faces 104, 106, and parallel side faces 108, 110. The dimensions of the tractor blocks 80 may vary depending on the cross-sectional shape and size of the specific wood product 10 to be fabricated along with other factors including the need to isolate the RF field within the curing zone from the steel chain 50. By way of example only, in accordance with one practical form of the invention for processing 2×4 stock having prefinished nominal cross-sectional dimensions of approximately 1⅝×3½ inches, each block has a width (between side faces 108, 110) of 4 inches, a depth (between front and rear faces 100, 102) of 4 inches and a height (between top and bottom faces 104, 106) of 3 inches. The rear face 102 of each block 80 has a horizontal channel 112 defined by an inner, vertical wall 114, to provide a recess for the drive chain 50. In accordance with the foregoing example, the channel may be about 1 inch deep. A set of chain links 82a, 82b, 84a and 84b and their associated lugs 88 and 90 are received within the confines of the channel 112 of each block 80. Machine screws 116 attach the opposed upper and lower pairs of lugs 88 to the inner wall 114 of each tractor block 80; alternate lug pairs 90 are not secured to the blocks so as to permit each block to swing freely away from the unattached lug 90 while travelling around the sprockets 52 and 54. The machine screws 116 are preferably made of an electrically insulative material such as nylon. It will thus be seen from FIGS. 10 and 11, for example, that the steel chain 50 and the front face 110 of each block 80 are separated by about 3 inches of electrically insulative material.

The endless tractor assemblies 38 and 40 include inner, linear arrays or runs 120 and 122, respectively, of aligned tractor blocks 80 whose front, rear and bottom faces 100, 102, 106 are substantially coplanar. The opposed inner, linear runs 120, 122 of the pair of tractor assemblies 38, 40 are parallel and the confronting, front faces 100 of the blocks 80 along substantially the entire length of the inner linear tractor block runs 120, 122 define between them an elongated press zone 124 of uniform, rectangular cross-section. The product 10 travels through the press zone 124 in a longitudinal direction from infeed to outfeed at a predetermined rate, as described above, during which pressure is applied by the linear block arrays 120, 122 transversely across the side faces 18 of the product 10, that is, normal to the planes of the glue lines 16. The tractor blocks 80 are supported by and slide with minimum friction along the phenolic base sheets 46. The tension applied to the drive chains 50 by the tensioners 66 helps to further reduce friction between the moving tractor blocks 80 and the phenolic base sheets 46.

The linear tractor block run 120 of the tractor assembly 38 is backed by a linear guide in the form of a stationary steel angle 130 having a horizontal flange 132 bolted to the frame 32 and a vertical flange 134 having a height approximately equal to that of the tractor blocks 80. The steel angle 130 extends longitudinally substantially the entire length of the inner linear tractor block run 120, the angle being so positioned that the rear faces 102 of the tractor blocks 80 along the inner run 120 bear against the vertical flange 134 of the angle. To reduce friction, a sheet 136 of UHMW plastic or like electrically insulating, low friction material, may be attached to the vertical flange 134 so as to be interposed between the rear faces 102 of the moving tractor blocks and the stationary vertical flange 134 of the angle 130. The contacting surfaces of the blocks 80 and plastic sheet 136 can be lubricated to further reduce to near zero the coefficient of friction of the relatively moving surfaces.

The inner tractor block run 122 of the tractor assembly 40 is backed by a linear guide in the form of a steel angle 140 identical to and coextensive with the fixed angle 130. The angle 140 comprises a horizontal flange 142 and a vertical flange 144. The horizontal flange 142 is secured along the length of the angle 140 to movable frame members 146. Several, for example, four, actuators in the form of air cylinders 150 are coupled to the movable frame members 146 by actuator rods 152. The movable angle 140 is disposed so that the rear faces 102 of the tractor blocks 80 along the inner linear tractor block run 122 are engaged by the vertical flange 144. Again, to reduce friction, a sheet 154 of UHMW plastic or like low friction electrically insulative material may be interposed between the rear faces 102 of the blocks and the vertical flange 144. A lubricant may be applied to the relatively movable surfaces along the linear run 122 to further reduce friction. Air introduced into the air cylinder actuators 150 at an appropriate pressure, for example, 150 psi, causes the air cylinders 150 to urge the movable angle 140 toward the fixed angle to apply to the wood product 10 disposed between the confronting faces 100 of the blocks 80 within the press zone 124 the relatively high transverse pressure required to eliminate any separation or gaps between the faces of adjacent laminations of the wood product 10. Further in this connection, the spacing between adjacent blocks 80 along the linear runs 120 and 122 is preferably minimized. Thus, adjacent blocks 80 may be disposed in close proximity to each other, that is, in abutting, or near abutting, relationship with spacings between the side faces 108, 110 of adjacent blocks being preferably ⅛-inch or less.

As the wood product 10 is advanced by the tractor assemblies 38 and 40 through the press zone 124 defined by the confronting inner linear tractor block runs 120, 122, the product passes through an adhesive curing zone 160 wherein the curing of the heat curable adhesive is accelerated. The curing zone 160 is defined by upper and lower parallel, elongated RF electrodes 162 and 164, respectively, extending longitudinally along at least a portion of the length of the press zone 124 and preferably along substantially a major portion of that length. In accordance with one practical form of the invention, the length of the upper and lower RF electrodes 162, 164 is twelve (12) feet while the length of the linear tractor runs 120, 122 is eighteen (18) feet. These lengths, of course, may be varied depending on the RF energy applied, the rate at which the stock 10 is advanced by the tractor assemblies 38, 40, the chemistry and composition of the heat curable adhesive, and so forth. These parameters and their adjustment and optimization will be evident to those skilled in the art.

By way of example, the upper electrode 162 may comprise a ½-inch thick plate of aluminum or similarly electrically conductive material, 3 inches wide and, as indicated, 12 feet long. The upper electrode 162 has an inner face 166, an outer face 168, and side edges 169. Secured to the outer face 168 of the electrode 162 is a bar 170 of UHMW plastic, or similar electrically insulative, high-strength material. By way of example, the bar 170 may have a 3 inch square cross section. Centrally located along the length of the upper electrode 162 and attached to the outer face 168 thereof is a vertical, electrically conductive post 172 having an upper end 174 projecting from the top of the insulating bar 170 for connection to an RF generator (not shown). A thin phenolic sheet 175 overlies the top surface of the bar 170; the upper electrode 162, the bar 170 and phenolic sheet 175 comprise an upper electrode assembly 176.

The RF generator should be selected to have an output to heat the glue lines 16 sufficiently so that the glue is substantially completely cured when the stock emerges from the curing zone. For example, given a residency time of 24 seconds within the curing zone (12 feet at 30 feet per minute) a 15 KW, 50 amp RF generator can be used for a product measuring 1⅝×3½ inches with four parallel, vertically oriented glue lines 16.

The lower electrode 164 may comprise, for example, a ½-inch thick steel plate, 3 inches wide and 12 feet long, disposed parallel and coextensive with the upper electrode 162. The lower electrode 164 has an inner face 178 and an outer face 180. The lower electrode is adjustably clamped along its outer face 180 to a longitudinal frame member 182 which may comprise a 3-inch square steel tube connected to electrical ground potential 184.

The opposed inner faces 166, 178 of the upper and lower electrodes 162, 164 define the curing zone 160 which is preferably positioned vertically so as to be symmetrical about a horizontal, central plane 190 that extends through the tractor blocks 80 midway between the top and bottom faces 104, 106 thereof and through the central plane of the drive and idle sprockets 52 and 54 and the chain 50. It thus will be seen that the compressing force applied by the air cylinders 150 to the wood product 10 through the angles 130 and 140 and the tractor blocks 80 will be applied to the product 10 uniformly and symmetrically about the central plane 190.

The upper electrode assembly 176 is biased downwardly by a plurality of actuators 192 (two of which are shown by way of example) spaced along the length of the bar 170. The actuators may take the form of air cylinders. The force applied by the air cylinders 192 to the upper electrode 162 assures that the inner face 166 of the upper electrode is maintained in firm engagement with the top surface 20 of the travelling wood product 10. Each air cylinder actuator 192 is mounted on an overhead, transverse frame member 194 having legs 196 secured to the frame 32. Each air cylinder actuator 192 has a piston rod 198 whose lower end is attached to the upper electrode insulating bar 170 by means of a clevis and pin assembly 200. Air at 30 psi, for example, admitted into the air cylinder actuators 192 causes the actuators to apply a steady downward pressure on the upper electrode assembly 176 and wood product 10, that pressure being resisted by the lower, fixed ground electrode 164. The actuators 192 can be used to raise the upper electrode assembly 176 to gain access to the press zone for maintenance.

It will thus be seen that the present invention provides a continuous press including an RF curing zone that is sufficiently isolated from surrounding metal members to prevent arcing and/or RF energy losses. Thus, the interelectrode spacing separating the inner faces 166 and 178 of the upper and lower electrodes 162, 164 is substantially less than the distances from the upper electrode edges 169 to the closest surrounding metallic structure. The electrically insulative sprockets 52 and 54 isolate the steel chain 50 from the metal frame 32, and by minimizing the spacings between adjacent blocks 80, leakage of RF energy from the upper electrode 162 to the chain 50 is further inhibited. In addition, the product 10 moves within press and curing zones that are preferably symmetrically positioned about the horizontal central plane 190. Such positioning in combination with the application of sufficient pressure to the product through the closely spaced blocks 80, prevents separation of the laminations as the product is being processed.

While the present invention has been described with reference to particular illustrative embodiments, the invention is not intended to be restricted to those embodiments but only by the appended claims. It will be appreciated that those skilled in the art can change or modify the described embodiments, or substitute equivalents for the various elements described and shown, without departing from the scope and spirit of the invention.

What is claimed is:

1. A wooden pallet having parallel ends and parallel sides, the pallet comprising:
   a top deck for receiving a load;
   a bottom deck parallel with the top deck; and
   at least two continuous stringers between the top and bottom decks to maintain said decks in spaced relationship, the stringers extending longitudinally between the ends of the pallet and wherein each stringer is constructed of continuous wood stock assembled from face laminated, glued wood strips, the adjacent wood strips of the stringer stock having contacting faces, the contacting faces of said adjacent stringer stock strips being in parallel planes, said planes being oriented parallel with the decks, the grain of all of the wood strips running generally in the same direction.

2. A wooden pallet as defined in claim 1, in which:
   the continuous wood stock has a uniform, rectangular cross section, said cross section having nominal lumber dimensions.

3. A wooden pallet, as defined in claim 1, in which:
   both top and bottom decks each comprise a plurality of parallel, spaced apart boards extending transversely between the sides of the pallet and wherein each board is constructed of wood stock assembled from face laminated, glued wood strips of random length.

4. A wooden pallet, as defined in claim 1, in which:
   each stringer has an upper surface and a lower surface parallel with the upper surface, the top deck being attached to the upper surface of the stringer and the bottom deck being attached to the lower surface of the stringer and wherein each stringer includes a pair of recesses extending upwardly from the lower surface of the stringer, the recesses being dimensioned and spaced apart to receive the forks of a fork lift.

5. A wooden pallet, as defined in claim 1, in which:
   the glued wood strips of each stringer comprise scrap strips of random length.

6. A wooden pallet having parallel ends and parallel sides, the pallet comprising:
   a top deck for receiving a load;
   a bottom deck parallel with the top deck;
   at least two continuous stringers between the top and bottom decks to maintain said decks in spaced relationship, the stringers extending longitudinally between the ends of the pallet and wherein each stringer is constructed of continuous wood stock assembled from face laminated, glued wood strips; and
   at least one of the decks comprising a plurality of parallel, spaced apart boards extending transversely between the sides of the pallet and wherein each deck board is constructed of wood stock assembled from face laminated, glued wood strips, the contacting faces of the adjacent wood strips comprising each of the plurality of deck boards being in parallel planes, the planes extending transversely between the sides of the pallet.

7. A wooden pallet, as defined in claim 6, in which:
   the glued wood strips of each stringer and each deck board comprise scrap strips of random length.

8. A wooden pallet, as defined in claim 6, in which:

the continuous wood stock has a uniform, rectangular cross section, said cross section having nominal lumber dimensions.

9. A wooden pallet, as defined in claim 6, in which:

both top and bottom decks each comprise a plurality of parallel, spaced apart boards extending transversely between the sides of the pallet and wherein each board is constructed of wood stock assembled from face laminated, glued wood strips.

10. A wooden pallet, as defined in claim 6, in which:

each stringer has an upper surface and a lower surface parallel with the upper surface, the top deck being attached to the upper surface of the stringer and the bottom deck being attached to the lower surface of the stringer and wherein each stringer includes a pair of recesses extending upwardly from the lower surface of the stringer, the recesses being dimensioned and spaced apart to receive the forks of a fork lift.

11. A wooden pallet, as defined in claim 6, in which:

the contacting faces of adjacent wood strips of the stringer stock are in parallel planes, the planes being oriented parallel with the decks, the grain of all of the wood strips running generally in the same direction.

12. A wooden pallet, as defined in claim 1, in which:

at least one of the decks comprises a plurality of parallel, spaced apart boards extending transversely between the sides of the pallet and wherein each board is constructed of wood stock assembled from face laminated glued wood strips of random length.

13. A wooden pallet, as defined in claim 12, in which:

the adjacent wood strips comprising each of the deck boards have contacting faces, the contacting faces of the adjacent wood strips comprising each of the deck boards being in parallel planes, the planes extending transversely between the sides of the pallet.

14. A wooden pallet having parallel ends and parallel sides, the pallet comprising:
- a top deck for receiving a load;
- a bottom deck parallel with the top deck; and
- at least two stringers between the top and bottom decks to maintain said decks in spaced relationship, the stringers extending longitudinally between the ends of the pallet and wherein each stringer is constructed of wood stock of uniform, rectangular cross section having nominal lumber dimensions, the wood stock comprising face laminated, glued wood strips, the contacting faces of adjacent wood strips of the stringer stock being in parallel planes oriented parallel with the decks, the grain of all of the wood strips running generally in the same longitudinal direction, and in which each stringer has an upper surface and a lower surface parallel with the upper surface, the top deck being attached to the upper surfaces of the stringers and the bottom deck being attached to the lower surfaces of the stringers and wherein each stringer includes a pair of recesses extending upwardly from the lower surface of the stringer, the recesses being dimensioned and spaced apart to receive the forks of a standard fork lift.

15. A wooden pallet, as defined in claim 14, in which:

the glued wood strips of each stringer comprise scrap strips of random length.

16. A wooden pallet, as defined in claim 14, in which:

at least one of the decks comprises a plurality of parallel, spaced apart boards extending transversely between the sides of the pallet and wherein each board is constructed of wood stock assembled from face laminated glued wood strips.

17. A wooden pallet, as defined in claim 16, in which:

the glued wood strips of each deck board comprise scrap strips of random length.

\* \* \* \* \*